US008534457B1

(12) United States Patent
Maguire

(10) Patent No.: US 8,534,457 B1
(45) Date of Patent: Sep. 17, 2013

(54) CONTROL APPARATUS FOR CONVEYOR OF PARTICULATE MATERIAL

(75) Inventor: Dennis R. Maguire, Lucan (CA)

(73) Assignee: Maguire Super-Shield Ltd., Lucan, Ontario (CA)

( * ) Notice: Subject to any disclaimer, the term of this patent is extended or adjusted under 35 U.S.C. 154(b) by 0 days.

(21) Appl. No.: 13/410,492

(22) Filed: Mar. 2, 2012

(51) Int. Cl.
*B65G 21/20* (2006.01)

(52) U.S. Cl.
USPC ..................... 198/860.5; 198/861.1

(58) Field of Classification Search
USPC .............. 198/860.1, 860.3, 860.5, 861.1
See application file for complete search history.

(56) References Cited

U.S. PATENT DOCUMENTS

| 4,744,702 | A | * | 5/1988 | Wiseman et al. | 406/88 |
| 5,072,663 | A | * | 12/1991 | Ellis-Brown | 99/331 |
| 5,421,678 | A | * | 6/1995 | Aidlin et al. | 406/88 |
| 5,492,216 | A | * | 2/1996 | McCoy et al. | 198/626.5 |
| 5,551,555 | A | * | 9/1996 | Gladieux et al. | 198/836.3 |
| 5,682,977 | A | * | 11/1997 | White | 198/860.5 |
| 5,730,831 | A | * | 3/1998 | Jensen et al. | 156/475 |
| 6,241,076 | B1 | * | 6/2001 | Maguire | 198/626.1 |
| 6,305,896 | B1 | * | 10/2001 | Szentimery | 414/502 |
| 6,695,125 | B1 | * | 2/2004 | Maguire | 198/626.3 |
| 6,843,367 | B1 | * | 1/2005 | Gentile et al. | 198/861.1 |

* cited by examiner

*Primary Examiner* — Douglas Hess

(57) ABSTRACT

A mount for operationally positioning a shield assembly above a conveyor belt assembly. The mount comprises a pair of spaced apart brackets attached on each side of the conveyor frame, and a pair of linkages pivotally connecting the brackets to the shield assembly.

5 Claims, 3 Drawing Sheets

CONTROL APPARATUS FOR CONVEYOR OF PARTICULATE MATERIAL

FIELD OF THE INVENTION

The present invention relates to a mount for a device which attaches to a conveyor belt to control the conveyance of particulate matter along the belt.

BACKGROUND OF THE INVENTION

Conveyors for moving or projecting particulate material such as stone, sand or gravel can be found in various applications. One particular application where conveyors are used to move particulate material is a vehicle known as a stone spreader. Stone spreaders are used to project particulate material to a desired location remote from the vehicle determined by the orientation and speed of the conveyor.

A shield assembly for a stone spreader facilitates the control of the particulate material at various conveyor belt speeds or for high elevation applications. The shield assembly enables the particulate material to be thrown a distance beyond the end of the conveyor which is dependant on the speed of the conveyor and the control offered by the use of the shield assembly. The shield assembly can increase the throwing distance of particular material to over four times over the traditional conveyor.

There are many different manufactures of stone spreader vehicles and thus accordingly a need exists for an improved mounting system that also offers a universal or standard way of operationally mounting a shield over the conveyor belt.

SUMMARY OF THE INVENTION

This invention relates to an improved mounting system for a shield used in associate with conveyor belts on stone spreader vehicles. A mount for operationally positioning a shield assembly above a conveyor belt assembly, the conveyor having a frame, the shield having opposing side frame elements is provided. The mount comprises a pair of spaced apart brackets fixedly attached on each side of the conveyor frame, and a pair of linkages having opposing ends, each linkage connecting one of the brackets to one side of the frame elements, wherein one opposing end of each linkage is pivotally attached to one of the mounting brackets, and the other opposing end of each linkage is pivotally attached to one of the side frame elements of the shield.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
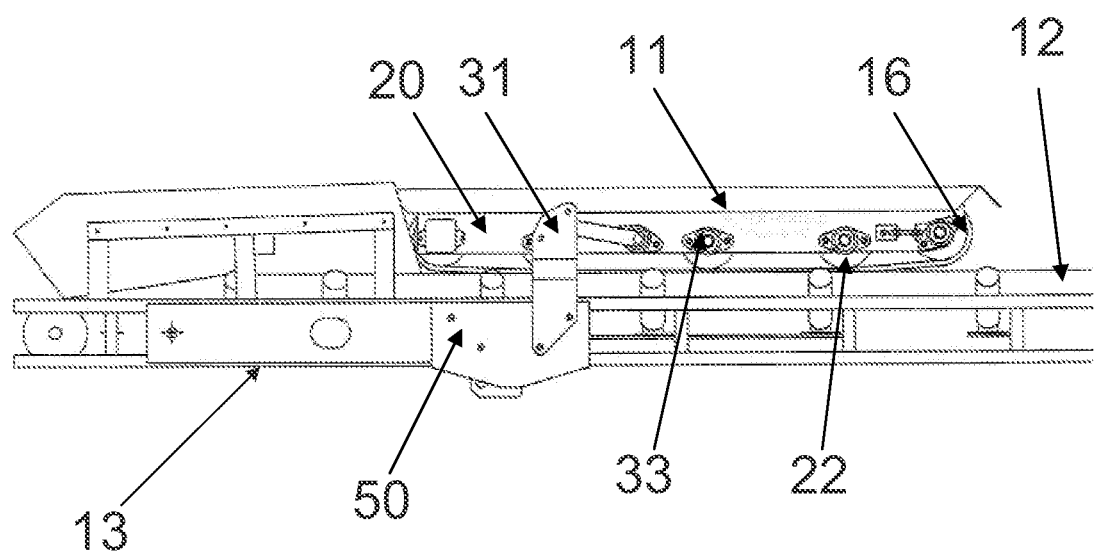
FIG. 1 is a partial side view of a shield assembly mounted in position above a conveyor belt assembly.

Referring to FIG. 1, a side view of conveyor belt assembly 13 is shown in vertical spaced apart relationship to a shield assembly 11 mounted above the conveyor belt 12 according to the present invention. The conveyor belt 12 receives particulate matter from the stone spreader vehicle for conveyance to a designated job location and is pivotally attached to the stone spreader by means of frame 50. The stone spreader includes a drive means (not shown) to power the conveyor belt 12 so as to move particulate material (not shown) deposited onto the conveyor belt 12 from the stone spreader bed or from a hopper. Material may be deposited onto the conveyor belt 12 directly from the truck bed or an additional conveyor may operate between the truck bed and the conveyor belt 12 to transfer the material. The conveyor belt 12 may be either smooth or ribbed.

The shield assembly 11 is comprised of a powered or unpowered endless belt 16 having a length and width. The endless belt 16 is mounted on wheels 22 or axles 24 attached between two longitudinal frame elements 20 one of which is shown. The frame elements 20 are provided with holes for receiving the ends of the axles 24. The axles 24 are rotatably secured within sealed bearing assemblies 33 mounted on the outside of the frame elements 20. The externally mounted sealed bearing assemblies 33 allow for the application of grease without disassembly of the shield assembly 11.

In a preferred embodiment, the shield assembly 11 includes a plurality of pairs of wheels 22 or axles 24 positioned along the length of the frame element 20 at suitable intervals so as to provide adequate support therefor. The number of wheels 22 and axles 24 between the ends of the belt 16 will vary depending on the size of the endless belt 16.

In an embodiment of the present invention, the motion of the conveyor belt 12 drives the endless belt 16 as a result of the frictional engagement between the belts 12 and 16. The frictional engagement may result from direct contact between the belts 12 and 16 or indirect contact, where the particulate material that is passing between the belts 12 and 16 transfers the motion from the conveyor belt 12 to the endless belt 16. In an alternative embodiment of the present invention a hydraulic motor is used to power the belt 16 independent of any frictional engagement between belts 16 and 12. The hydraulic motor (not shown) is installed on the frame elements 20 and drives a sprocket wheel which is operatively engaged with the underside of the endless belt 16.

Figure 2:
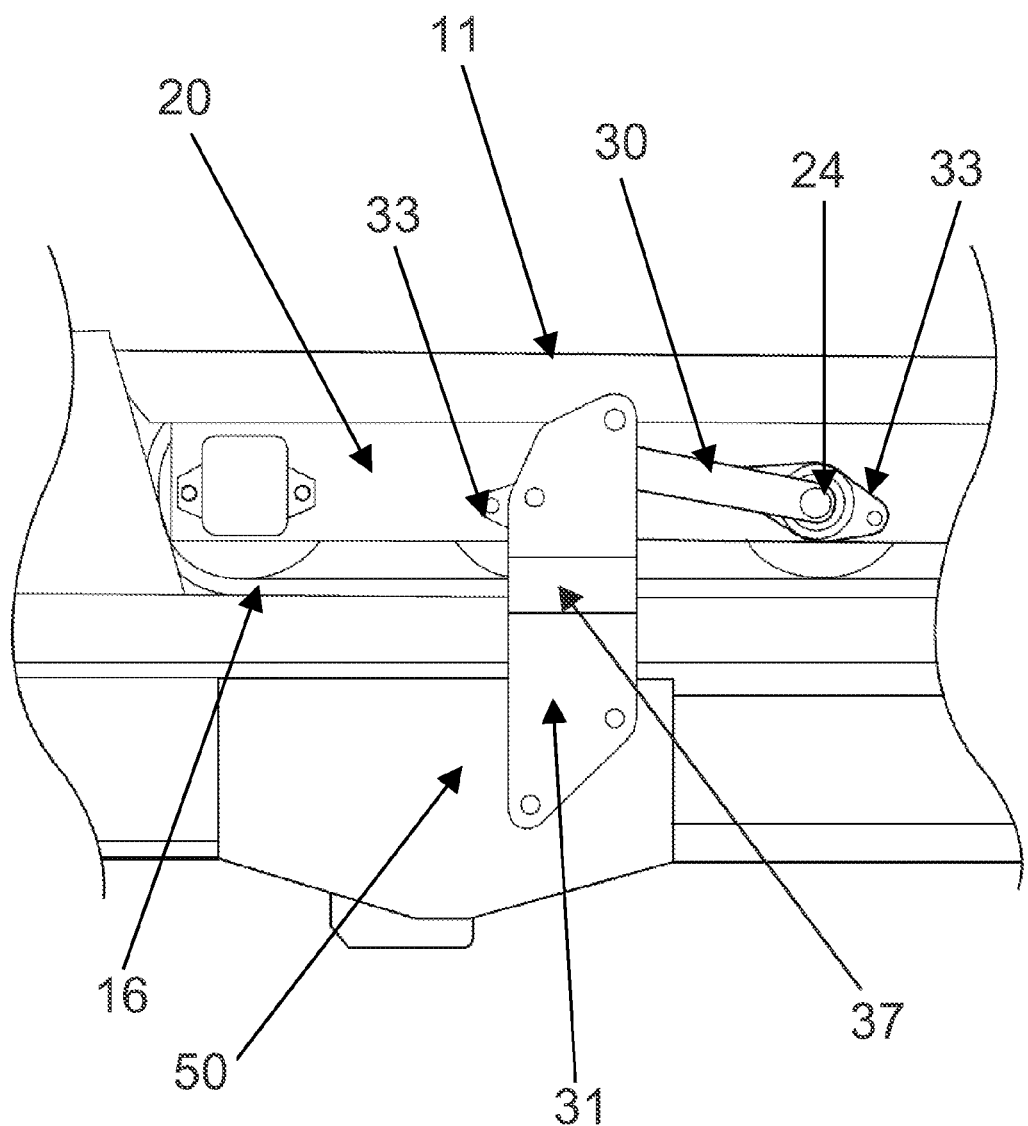
FIG. 2 is an enlarged partial view of FIG. 1 showing the mount in accordance with the present invention.
Figure 3:
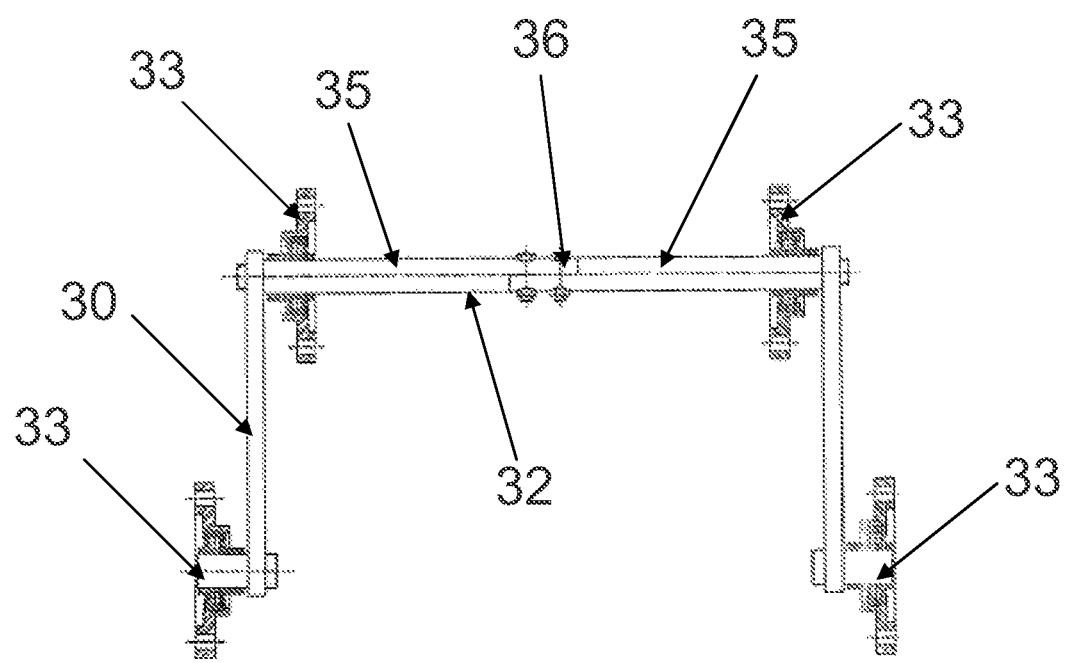
FIG. 3 is a sectional assembly view of the mount according to the present invention.

The shield assembly 11 is operationally mounted above the conveyor belt 12 between a pair of mounts one of which is shown in FIGS. 2 and 3. Each mount comprises two mounting brackets 31 attached to the frame 50. The mounting brackets 31 support the shield assembly 11 therebetween by means of linkages 30 pivotally attached to the mounting brackets 31 and frame elements 20 by means of bearing assemblies 33. The brackets 31 have hole attachment means to accommodate for the attachment to the frame 50 and the pivoting linkages 30 as described. The central portion 37 of the mounting brackets 31 may be outwardly or inwardly bent as required to allow the top portion of the bracket 31 and linkage assemblies to accommodate and clear the frame 50 of the conveyor to avoid interference with the conveyor belt 12 and the shield assembly 11. Depending on the conveyor belt assembly 13 installed on a stone spreader vehicle, the height and width of the brackets 31 may be easily and selectively varied so that the mount according to this invention is in fact universal and suitable for all stone spreader applications.

A connecting rod 32 extends between the frame elements 20 to provide stiffness and support. As shown in FIG. 3, the connecting rod 32 may consist of four rod segments 35 extending between the second ends of the pivoting linkages 30 releasably secured together by two bolted connections 36. The bolted connections 36 allow for the disassembly of the connecting rod 32 for bearing replacement.

The mount assembly controls vertical movement of the shield assembly 11 and allows for up and down vertical movement of the shield assembly 11 when particulate material passes between the belts 12 and 16. The maximum vertical deflection of the shield assembly 11 is limited by the vertical range of the pivoting linkage. The mount also allows for front to back tilting and raising as required. The mount prevents side-to-side rocking of the shield assembly 11 by enabling that the vertical deflection of the shield assembly 11 to be equal across the width of belt 16.

It will be apparent to those skilled in the art that the apparatus of the invention can be utilized with any conveyor and with a variety of material. For example, particulate material may include sand, gravel, salt, rock etc. The conveyor assembly may be associated with trucks (as described above) or with mining, equipment, farming equipment etc.

Although the invention has been described with reference to certain specific embodiments, various modifications thereof will be apparent to those skilled in the art without departing from the spirit and scope of the invention as outlined in the claims appended hereto.

The invention claimed is:

1. A mount for operationally positioning a shield assembly having a first conveyor belt above a conveyor belt assembly having a second conveyor belt, the conveyor assembly having a frame, the shield assembly having opposing side frame elements, the mount comprising:

A pair of spaced apart brackets fixedly attached on each side of the conveyor frame; and A pair of linkages having opposing ends, each linkage connecting one of the brackets to one side of the frame elements, wherein
one opposing end of each linkage is pivotally attached to one of the mounting brackets, and
the other opposing end of each linkage is pivotally attached to one of the side frame elements of the shield wherein the shield assembly comprises at least one axle mounted between the frame elements having wheels for supporting the first conveyor belt, wherein the axle is attached to the frame elements by bearing assemblies located on the outside of the frame elements.

2. The mount of claim 1, wherein the brackets are horizontally aligned with respect to the conveyor frame.

3. The mount of claim 1, wherein the pair of linkages are pivotally attached to the mounting brackets and the side frame elements by bearings assemblies.

4. The mount of claim 1, wherein the mount further comprises a connecting rod extending between the side frame elements of the shield.

5. The mount of claim 4, wherein the connecting rod further comprises multiple rod segments releasably secured together.

* * * * *